(12) United States Patent
Tsuboi et al.

(10) Patent No.: US 11,214,521 B2
(45) Date of Patent: *Jan. 4, 2022

(54) POROUS MATERIAL, CELL STRUCTURE, AND METHOD OF PRODUCING POROUS MATERIAL

(71) Applicant: NGK INSULATORS, LTD., Nagoya (JP)

(72) Inventors: Mika Tsuboi, Nagoya (JP); Yunie Izumi, Nagoya (JP); Takahiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 6 days.

This patent is subject to a terminal disclaimer.

(21) Appl. No.: 16/357,852

(22) Filed: Mar. 19, 2019

(65) Prior Publication Data

US 2019/0292104 A1 Sep. 26, 2019

(30) Foreign Application Priority Data

Mar. 26, 2018 (JP) .............................. JP2018-057354

(51) Int. Cl.
*C04B 35/565* (2006.01)
*C04B 35/587* (2006.01)
(Continued)

(52) U.S. Cl.
CPC .......... *C04B 35/565* (2013.01); *C04B 35/587* (2013.01); *C04B 35/6316* (2013.01);
(Continued)

(58) Field of Classification Search
CPC ...................... Y10T 428/24149; C04B 35/565
See application file for complete search history.

(56) References Cited

U.S. PATENT DOCUMENTS

| 2004/0053005 A1* | 3/2004 | Hamanaka | ............ F01N 3/0222 428/116 |
| 2006/0003889 A1* | 1/2006 | Furukawa | ............. C04B 35/565 502/178 |

(Continued)

FOREIGN PATENT DOCUMENTS

| JP | 5922629 B2 | 5/2016 |
| JP | 6043340 B2 | 12/2016 |

(Continued)

OTHER PUBLICATIONS

Japanese Office Action (with English translation), Japanese Application No. 2018-057354, dated Sep. 16, 2021 (6 pages).

*Primary Examiner* — Mark Ruthkosky
*Assistant Examiner* — Julia L Rummel
(74) *Attorney, Agent, or Firm* — Burr & Brown, PLLC (57) ABSTRACT

A porous material includes aggregate particles and a binding material. In the aggregate particles, oxide films containing cristobalite are provided on surfaces of particle bodies that are silicon carbide particles or silicon nitride particles. The binding material contains cordierite and binds the aggregate particles together in a state where pores are provided therein. The mass ratio of the cordierite to the whole of the porous material is in the range of 10 to 40 mass %. The oxide films that exist between the particle bodies and the binding material have a thickness less than or equal to 0.90 μm.

7 Claims, 4 Drawing Sheets

(51) Int. Cl.
*C04B 35/63* (2006.01)
*C04B 38/00* (2006.01)
*C04B 35/195* (2006.01)

(52) U.S. Cl.
CPC ...... *C04B 38/0009* (2013.01); *C04B 38/0058* (2013.01); *C04B 35/195* (2013.01); *C04B 2235/3206* (2013.01); *C04B 2235/3217* (2013.01); *C04B 2235/3481* (2013.01); *C04B 2235/3826* (2013.01); *C04B 2235/3873* (2013.01); *C04B 2235/602* (2013.01); *C04B 2235/663* (2013.01); *C04B 2235/96* (2013.01); *Y10T 428/24149* (2015.01)

(56) References Cited

U.S. PATENT DOCUMENTS

| | | | |
|---|---|---|---|
| 2006/0216466 A1* | 9/2006 | Yoshida | B82Y 30/00 428/116 |
| 2014/0290195 A1 | 10/2014 | Izumi et al. | |
| 2014/0370232 A1 | 12/2014 | Izumi et al. | |
| 2015/0013284 A1* | 1/2015 | Ota | C04B 35/62897 55/385.3 |
| 2015/0093540 A1* | 4/2015 | Ichikawa | C04B 35/573 428/117 |
| 2015/0259254 A1* | 9/2015 | Ichikawa | C04B 38/0019 428/116 |
| 2017/0282108 A1 | 10/2017 | Mizuno et al. | |

FOREIGN PATENT DOCUMENTS

| | | | |
|---|---|---|---|
| JP | 6125869 B2 | 5/2017 | |
| JP | 2017-178721 A | 10/2017 | |

\* cited by examiner

POROUS MATERIAL, CELL STRUCTURE, AND METHOD OF PRODUCING POROUS MATERIAL

TECHNICAL FIELD

The present invention relates to a porous material, a cell structure, and a method of producing a porous material.

BACKGROUND ART

Porous materials produced by binding aggregate particles such as silicon carbide particles together with a binding material that contains cordierite have excellent properties such as high thermal shock resistance. For example, Japanese Patent No. 5,922,629 discloses a porous material characterized in that its binding material contains crystalline cordierite and cerium or zirconium elements and that the mass ratio of the binding material to the total mass of the aggregate and the binding material falls within a predetermined range. Such a porous material is molded into a honeycomb structure whose interior is partitioned into a plurality of cells by partition walls, and is used in, for example, a catalyst carrier or a diesel particulate filter (DPF).

Incidentally, the honeycomb structure is exposed to high-temperature exhaust gas, and therefore it is preferable that oxide films are provided on surfaces of the aggregate particles by oxidation treatment in order to improve oxidation resistance. In this case, if the aggregate particles are silicon carbide particles or silicon nitride particles, the oxide films will contain cristobalite. On the other hand, in the case where a selective catalytic reduction (SCR) catalyst such as zeolite is to be supported by the honeycomb structure, the honeycomb structure is heated to a temperature of 200 to 400° C. in the process of drying slurry that contains the catalyst. At this time, the porous material with the oxide films formed therein has a high thermal expansion coefficient due to phase transition of the cristobalite, and therefore complicated control such as temperature condition control is necessary in order to appropriately support the catalyst. Accordingly, there is demand for the ability to reduce the thermal expansion coefficient of the porous material having improved oxidation resistance.

SUMMARY OF INVENTION

The present invention is directed to a porous material, and it is an object of the present invention to reduce the thermal expansion coefficient of the porous material having improved oxidation resistance.

The porous material according to the present invention includes aggregate particles in which oxide films containing cristobalite are provided on surfaces of particle bodies that are silicon carbide particles or silicon nitride particles, and a binding material that contains cordierite and binds the aggregate particles together in a state where pores are provided therein. A mass ratio of the cordierite to a whole of the porous material is in a range of 10 to 40 mass %, and the oxide films that exist between the particle bodies and the binding material have a thickness less than or equal to 0.90 µm.

According to the present invention, it is possible to reduce the thermal expansion coefficient of the porous material having improved oxidation resistance.

In a preferable embodiment of the present invention, the oxide films that exist between the particle bodies and the pores have a thickness greater than or equal to 0.50 µm.

In another preferable embodiment of the present invention, the thickness of the oxide films that exist between the particle bodies and the binding material is less than or equal to the thickness of the oxide films that exist between the particle bodies and the pores.

In another preferable embodiment of the present invention, the binding material contains 10 to 15 mass % of a magnesium oxide component, 40 to 55 mass % of an aluminum oxide component, and 35 to 45 mass % of a silicon dioxide component to a whole of the binding material.

In a preferable porous material, a thermal expansion coefficient at 250° C. with reference to 40° C. is lower than or equal to 5.0 ppm/K.

Also, the bending strength of the porous material is preferably higher than or equal to 5.0 MPa.

For example, the open porosity of the porous material is higher than or equal to 50% and lower than or equal to 70%.

The present invention is also directed to a cell structure. The cell structure according to the present invention is made of the above-described porous material, and its interior is partitioned into a plurality of cells by partition walls.

The present invention is also directed to a method of producing a porous material. The method of producing a porous material according to the present invention includes a) obtaining a compact by molding a mixture of an aggregate raw material, a raw material for binding material, and a pore-forming material, b) obtaining a fired compact by firing the compact in an inert atmosphere, and c) obtaining a porous material by subjecting the fired compact to an oxidation treatment in an oxidizing atmosphere. The aggregate raw material contains silicon carbide particles or silicon nitride particles, and the raw material for binding material contains 35 to 45 mass % of talc, 45 to 60 mass % of aluminum oxide, and 0 to 10 mass % of silicon dioxide to a whole of the raw material for binding material.

These and other objects, features, aspects and advantages of the present invention will become more apparent from the following detailed description of the present invention when taken in conjunction with the accompanying drawings.

DESCRIPTION OF EMBODIMENTS

Honeycomb Structure

Figure 1:
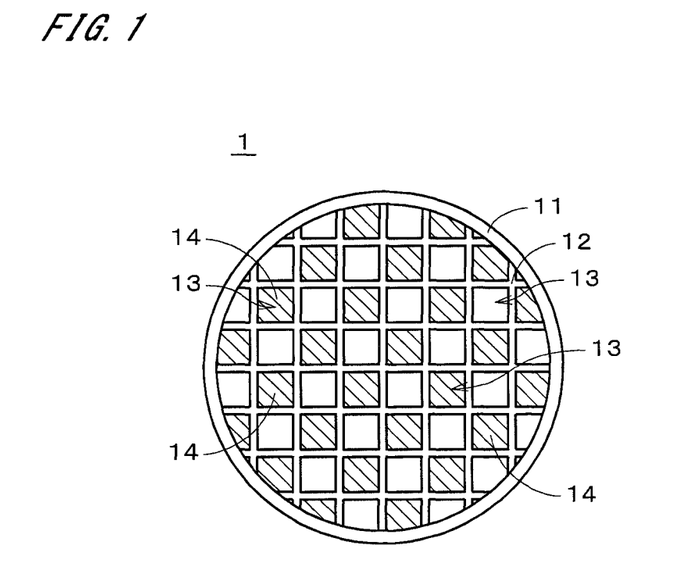
FIG. 1 illustrates a honeycomb structure.
Figure 2:
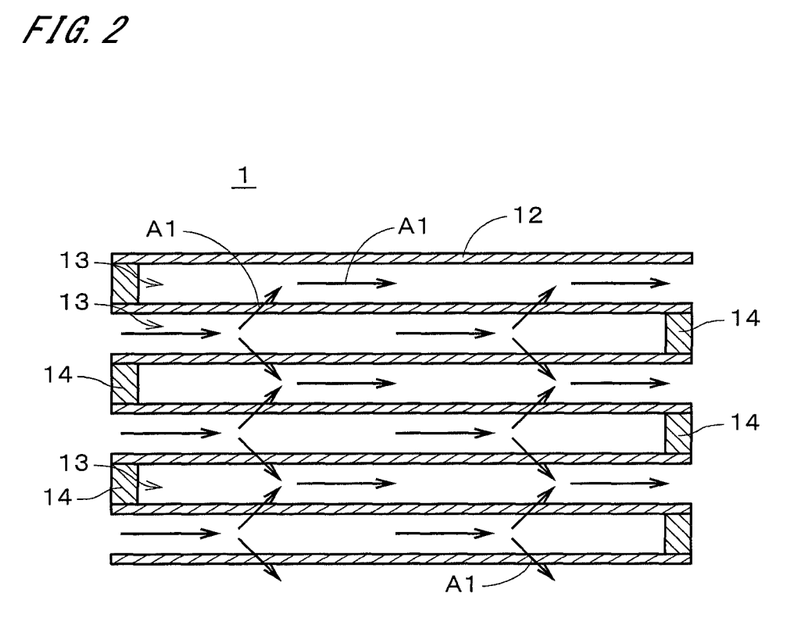
FIG. 2 is a sectional view of the honeycomb structure.

FIG. 1 illustrates a honeycomb structure 1 according to an embodiment of the present invention in simplified form. The honeycomb structure 1 is a tubular member that is long in one direction, and FIG. 1 illustrates the end face on one side in the longitudinal direction of the honeycomb structure 1. FIG. 2 is a sectional view of the honeycomb structure 1 and illustrates part of a section extending in the longitudinal direction. The honeycomb structure 1 is used in, for example, a filter such as a DPF. The honeycomb structure 1 may also be used in different applications other than filters.

The honeycomb structure 1 includes a tubular outer wall 11 and partition walls 12. The tubular outer wall 11 and the partition walls 12 are made of a porous material, which will be described later. The tubular outer wall 11 has a tubular shape extending in the longitudinal direction. A cross-sectional shape of the tubular outer wall 11 perpendicular to the longitudinal direction is, for example, circular, or may be polygonal or any other shape. The partition walls 12 are provided in the interior of the tubular outer wall 11 and partition the interior into a plurality of cells 13. The thickness of the partition walls 12 is, for example, greater than or equal to 30 micrometers (μm) and preferably greater than or equal to 50 μm. The thickness of the partition walls 12 is, for example, less than or equal to 1000 μm, preferably less than or equal to 500 μm, and more preferably less than or equal to 350 μm.

Each cell 13 is a space extending in the longitudinal direction. A cross-sectional shape of the cells 13 perpendicular to the longitudinal direction is, for example, polygonal (e.g., triangular, quadrangular, pentagonal, or hexagonal), or may be circular or any other shape. The plurality of cells 13 typically has the same cross-sectional shape. Alternatively, the plurality of cells 13 may include cells 13 having different cross-sectional shapes. The density of the cells is, for example, higher than or equal to 10 cells per square centimeters (cells/cm$^2$), preferably higher than or equal to 20 cells/cm$^2$, and more preferably higher than or equal to 50 cells/cm$^2$. The density of the cells is, for example, lower than or equal to 200 cells/cm$^2$ and preferably lower than or equal to 150 cells/cm$^2$. The honeycomb structure 1 is a cell structure whose interior is partitioned into the plurality of cells 13 by the partition walls 12.

In the case where the honeycomb structure 1 is used as a DPF, a predetermined gas flows, using one end in the longitudinal direction of the honeycomb structure 1 as an inlet and the other end as an outlet. A predetermined number of cells 13 are each provided with a sealer 14 at its end on the inlet side, and the remaining cells 13 are each provided with a sealer 14 at its end on the outlet side. Therefore, the gas flowing into the honeycomb structure 1 travels from the cells 13 whose inlet side is not sealed to the cells 13 whose outlet side is not sealed through the partition walls 12 (see arrows A1 in FIG. 2). At this time, particulate substances in the gas are collected efficiently by the partition walls 12. At each end on the inlet and outlet sides of the honeycomb structure 1, it is preferable that the sealers 14 are alternately provided in the direction of arrangement of the cells 13. In the honeycomb structure 1, a catalyst is supported as necessary.

Porous Material

Figure 3:
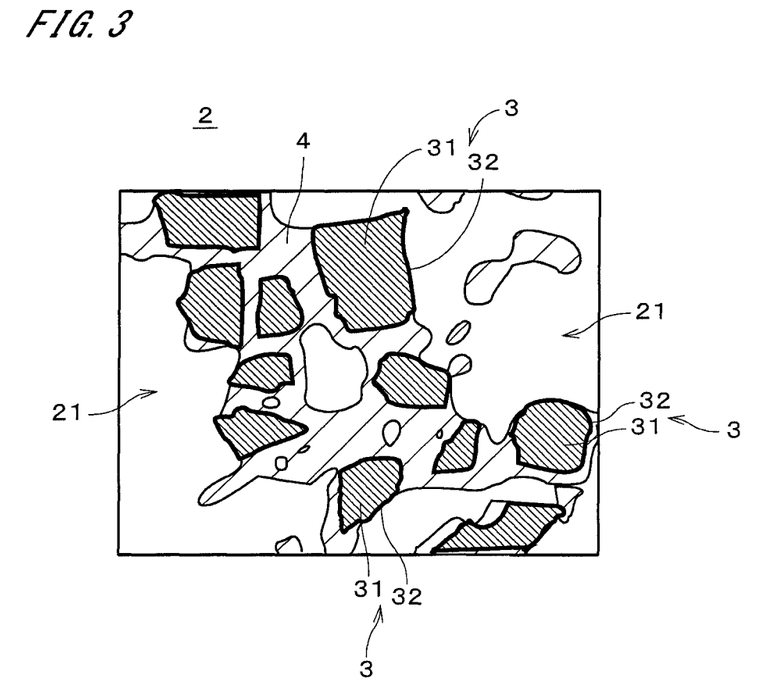
FIG. 3 illustrates a structure of a porous material.

FIG. 3 illustrates a structure of a porous material 2 that forms the honeycomb structure 1. The porous material 2 is a porous sintered compact and includes aggregate particles 3 and a binding material 4. The binding material 4 binds the aggregate particles 3 together in a state where pores 21 are provided therein. The binding material 4 contains crystalline cordierite. In the porous material 2, substances other than the aggregate particles 3 are in principle assumed to be included in the binding material 4.

Each aggregate particle 3 includes a particle body 31. The particle bodies 31 are silicon carbide (SiC) particles or silicon nitride ($Si_3N_4$) particles. The porous material 2 may contain both particle bodies 31 of silicon carbide particles and particle bodies 31 of silicon nitride particles. In the present embodiment, the particle bodies 31 are silicon carbide particles. The particle bodies 31 of the aggregate particles 3 are typically particles of a substance that is the largest in amount among substances that form the porous material 2. The aggregate particles 3 further include oxide films 32 that are provided on surfaces of the particle bodies 31. In FIG. 3, the oxide films 32 are indicated by thick lines. Preferably, each aggregate particle 3 consists of a particle body 31 and the oxide films 32. The oxide films 32 are oxide layers that are formed on the surfaces of the particle bodies 31 made of non-oxide by heat treatment performed in an oxidizing atmosphere. The oxide films 32 contain cristobalite. The porous material 2 can obtain excellent oxidation resistance by providing the oxide films 32 around the particle bodies 31.

Figure 4:
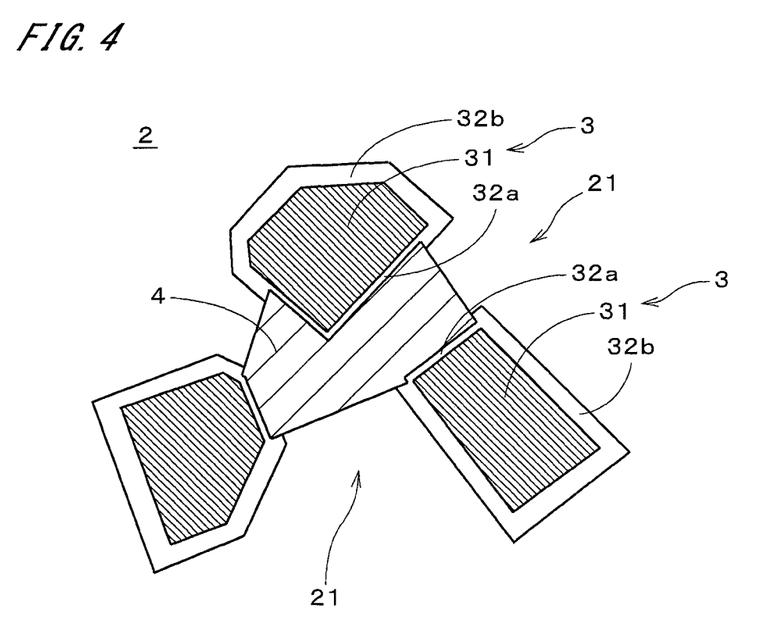
FIG. 4 is a diagram for describing oxide films of the porous material.

FIG. 4 is a diagram for describing oxide films 32a and 32b of the porous material 2. FIG. 4 schematically illustrates the particle bodies 31, the oxide films 32a and 32b, and the binding material 4. In the porous material 2, the thickness of the oxide films 32a that exist between the particle bodies 31 and the binding material 4 (hereinafter, referred to as "oxide films 32a on the side of the binding material 4") differs from the thickness of the oxide films 32b that exist between the particle bodies 31 and the pores 21 (hereinafter, referred to as "oxide films 32b on the side of the pores 21").

Figure 5:
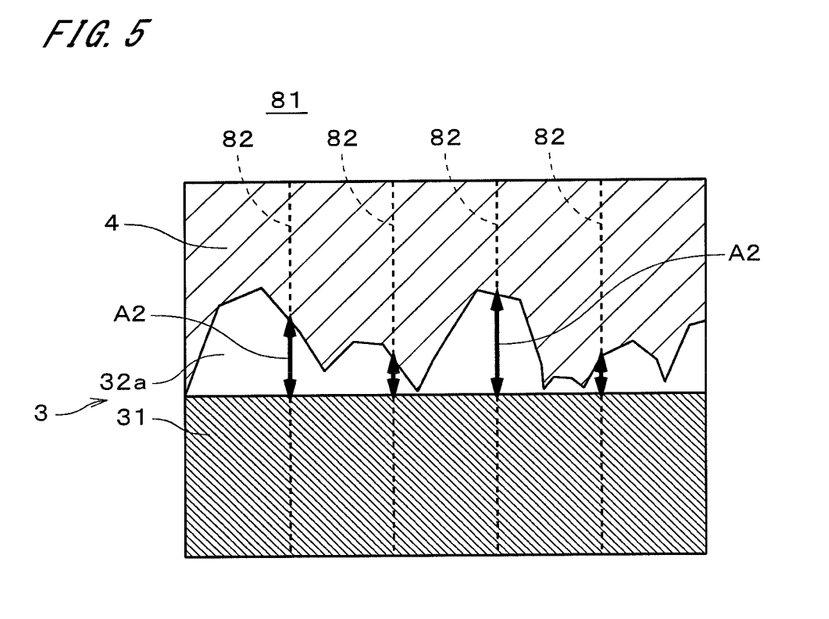
FIG. 5 is a diagram for describing how to measure the thicknesses of the oxide films.

Here, a method of measuring the thicknesses of the oxide films 32a and 32b will be described. In the measurement of the thickness of the oxide films 32a on the side of the binding material 4, for example, a section obtained by mirror polishing the porous material 2 is observed with a scanning electron microscope (SEM) under a predetermined magnification. FIG. 5 schematically illustrates an oxide film 32a on the side of the binding material 4 and shows an image of a field of view 81 observed with an SEM under a magnification of 10,000 times. In the image in FIG. 5, the surface of the particle body 31 extends in the lateral direction, and four parting lines 82 are set so as to divide the aforementioned field of view 81 into five equal parts in the lateral direction. In FIG. 5, each parting line 82 is indicated by a broken line. The four parting lines 82 are almost orthogonal to the surface of the particle body 31. Then, an energy-dispersive X-ray spectroscopy (EDS) measurement is performed at each of positions at 0.2 μm intervals on each parting line 82 from the surface of the particle body 31 toward the binding material 4.

At this time, positions at which a predetermined element included in relatively large amounts in the binding material 4 is not detected are treated as being included in the oxide film 32a, and positions at which the aforementioned element is detected are treated as being included in the binding material 4 (i.e., as not being included in the oxide film 32a). Therefore, on each parting line 82, the length from the surface of the particle body 31 to the farthest position from that surface among the positions at which the aforementioned element is not detected (i.e., lengths indicated by arrows A2 in FIG. 5; here, a multiple of 0.2 μm) is assumed to be the thickness of the oxide film 32a on that parting line 82. Then, a mean value of the thicknesses of the oxide films 32a on a plurality of parting lines 82 in a plurality of fields of view 81 is obtained as the thickness of the oxide films 32a on the side of the binding material 4. The aforementioned element is, for example, magnesium (Mg). In the case where the binding material 4 contains cerium dioxide ($CeO_2$), the aforementioned element may contain cerium.

The thickness of the oxide films 32b on the side of the pores 21 is also measured by the same method as that for the oxide films 32*a* on the side of the binding material 4. Specifically, a field of view 81 is set in which the surface of a particle body 31 in contact with the oxide film 32*b* on the side of the pore 21 extends in the lateral direction, and a plurality of parting lines 82 is set in that field of view 81. Then, an EDS measurement is performed at each of positions at 0.2 μm intervals on each parting line 82 from the surface of the particle body 31 toward the pore 21. At this time, positions at which a predetermined element included in the oxide film 32*b* is detected are treated as being included in the oxide film 32*b*, and positions at which the aforementioned element is not detected are treated as being included in the pore 21 (as not being included in the oxide film 32*b*). Therefore, on each parting line 82, the length from the surface of the particle body 31 to the farthest position from that surface among the positions at which the aforementioned element is detected is assumed to be the thickness of the oxide film 32*b* on that parting line 82. Then, a mean value of the thicknesses of the oxide films 32*b* on a plurality of parting lines 82 in a plurality of fields of view 81 is obtained as the thickness of the oxide films 32*b* on the side of the pore 21. The aforementioned element is, for example, oxygen (O).

The thickness of the oxide films 32*a* on the side of the binding material 4 is less than or equal to the thickness of the oxide films 32*b* on the side of the pores 21. For example, the thickness of the oxide films 32*a* on the side of the binding material 4 is made to be less than or equal to 0.90 μm by adjusting the composition of the binding material 4 as will be described later. The thickness of the oxide films 32*a* on the side of the binding material 4 may be reduced to an unmeasurable level. That is, the lower limit value of the thickness of the oxide films 32*a* on the side of the binding material 4 is 0 μm. It can be thought that the thickness of the oxide films 32*a* on the side of the binding material 4 has no influence on oxidation resistance, because the oxide films 32*a* on the side of the binding material 4 are covered with the binding material 4.

Figure 6:
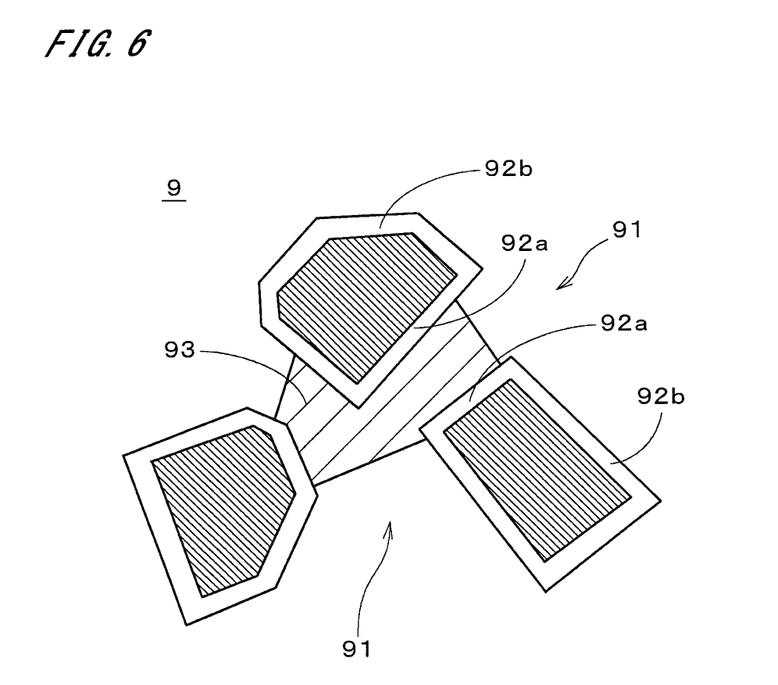
FIG. 6 is a diagram for describing oxide films of a porous material according to a comparative example.

FIG. 6 is a diagram for describing oxide films 92*a* and 92*b* of a porous material 9 according to a comparative example. The porous material 9 according to the comparative example differs in the composition of its binding material 93 from the porous material 2 in FIG. 4, and the oxide films 92*a* on the side of the binding material 93 have a great thickness, like the oxide films 92*b* on the side of the pores 91. Specifically, the thickness of the oxide films 92*a* on the side of the binding material 93 is greater than 0.90 μm. Also, the thickness of the oxide films 92*a* on the side of the binding material 93 is greater than the thickness of the oxide films 92*b* on the side of the pores 91. Like the oxide films 32*a* and 32*b* of the porous material 2, the oxide films 92*a* and 92*b* contain cristobalite. The cristobalite undergoes sudden volume changes due to its phase transition from the α phase to the β phase at temperatures close to 200° C. Accordingly, the porous material 9 according to the comparative example will have high thermal expansion coefficients in a temperature range that includes temperatures close to 200° C.

In contrast, in the porous material 2 in FIG. 4, the thickness of the oxide films 32*a* on the side of the binding material 4 is less than or equal to 0.90 μm. This helps reducing the amount of cristobalite in the porous material 2 having improved oxidation resistance and achieves a reduction in thermal expansion coefficient. As will be described later, the porous material 2 also ensures a certain level of mechanical strength (here, bending strength), and therefore, combined with a reduction in thermal expansion coefficient, it is possible to improve thermal shock resistance. In order to further reduce the thermal expansion coefficient, the thickness of the oxide films 32*a* on the side of the binding material 4 is preferably less than or equal to 0.75 μm and more preferably less than or equal to 0.60 μm.

The thickness of the oxide films 32*b* on the side of the pores 21 is, for example, greater than or equal to 0.50 μm, preferably greater than or equal to 0.60 μm, and more preferably greater than or equal to 0.70 μm. As the thickness of the oxide films 32*b* on the side of the pores 21 increases, the oxidation resistance of the porous material 2 improves. On the other hand, from the viewpoint of further reducing the thermal expansion coefficient, the thickness of the oxide films 32*b* on the side of the pores 21 is, for example, less than or equal to 5.0 μm, preferably less than or equal to 3.5 μm, and more preferably less than or equal to 2.0 μm.

As described previously, the thickness of the oxide films 32*a* on the side of the binding material 4 is less than or equal to the thickness of the oxide films 32*b* on the side of the pores 21. Therefore, the thermal expansion coefficient of the porous material 2 can be reduced more reliably. In order to further reduce the thermal expansion coefficient of the porous material 2, the thickness of the oxide films 32*a* on the side of the binding material 4 is preferably less than or equal to 0.8 times the thickness of the oxide films 32*b* on the side of the pores 21 and more preferably less than or equal to 0.65 times the thickness of the oxide films 32*b* on the side of the pores 21. For example, the thickness of the oxide films 32*a* on the side of the binding material 4 is greater than or equal to 0.2 times the thickness of the oxide films 32*b* on the side of the pores 21.

In a preferable porous material 2, the rate of expansion of the length thereof during heating from 40° C. to 250° C., i.e., a thermal expansion coefficient at 250° C. with reference to 40° C. (hereinafter, referred to as "thermal expansion coefficient at temperatures of 40 to 250° C."), is lower than or equal to 5.0 ppm/K (i.e., $5.0 \times 10^{-6}$/K). A more preferable porous material 2 has a thermal expansion coefficient lower than or equal to 4.8 ppm/K. The thermal expansion coefficient is preferably kept as low as possible, and the lower limit value of the thermal expansion coefficient is, for example, 1.0 ppm/K. The thermal expansion coefficient is, for example, a value obtained by cutting out a test specimen with dimensions of 3 cells high×3 cells wide×20 mm long from the honeycomb structure 1 and measuring a mean coefficient of linear thermal expansion in the temperature range of 40 to 250° C. in a direction parallel to the flow paths in the honeycomb structure 1 by a method compliant with JIS R1618.

In the case where an SCR catalyst such as zeolite is to be supported by the honeycomb structure 1, the honeycomb structure 1 is heated to a temperature close to 200° C. in the process of drying slurry that contains the catalyst. The honeycomb structure 1 (porous material 2) having low thermal expansion coefficients in the temperature range of 40 to 250° C. can appropriately support the SCR catalyst.

In the porous material 2, the mass ratio of the aggregate particles 3 to the whole of the porous material 2 is higher than 50 mass %. That is, the mass ratio of the binding material 4 to the whole of the porous material 2 is less than 50 mass %. Also, the binding material 4 contains 50 mass % or more of cordierite to the whole of the binding material 4. That is, the binding material 4 is preferably composed primarily of cordierite.

The mass ratio of the cordierite to the whole of the porous material 2 is, for example, higher than or equal to 10 mass %, preferably higher than or equal to 12 mass %, and more preferably higher than or equal to 15 mass %. Therefore, the porous material 2 can ensure a certain level of mechanical strength. Although the porous material 2 is required to have a high porosity as will be described later, an excessive increase in the amount of the binding material 4 will increase the difficulty of achieving a high porosity of the porous material 2. In order to easily achieve a high porosity of the porous material 2, the mass ratio of the cordierite, which is the major component of the binding material 4, to the whole of the porous material 2 is, for example, lower than or equal to 40 mass %, preferably lower than or equal to 30 mass %, and more preferably lower than or equal to 25 mass %.

The mass ratios of crystalline phases of components (e.g., SiC, cristobalite, and cordierite) in the porous material 2 are, for example, obtained in the way described below. First, an X-ray diffraction pattern of the porous material 2 is obtained using an X-ray diffractometer. A multi-function X-ray powder diffractometer (D8 ADVANCE by Bruker Corporation) is used as the X-ray diffractometer. Conditions for X-ray, diffiactometry include a CuKα-ray source, 10 kV, 20 mA, and 2θ=5 to 100°. Then, obtained X-ray diffraction data is analyzed by the Rietveld method using analysis software TOPAS (by Bruker AXS) to quantitatively determine each crystalline phase. The mass ratio of each crystalline phase of components is calculated assuming that the sum of the masses of all detected crystalline phases is 100 mass %.

The aforementioned cordierite is formed of a magnesium oxide (MgO) component, an aluminum oxide ($Al_2O_3$) component, and a silicon dioxide ($SiO_2$) component. In a preferable porous material 2, the binding material 4 contains 10 to 15 mass % of the magnesium oxide component, 40 to 55 mass % of the aluminum oxide component, and 35 to 45 mass % of the silicon dioxide component to the whole of the binding material 4. In this way, the oxide films 32a on the side of the binding material 4, which have a thickness less than or equal to 0.90 μm, are easily obtained as previously described. The lower limit value of the magnesium oxide component is more preferably 11 mass %. The lower limit value of the aluminum oxide component is more preferably 45 mass %. The upper limit value of the silicon dioxide component is more preferably 44 mass %. By adjusting the composition ratio of the binding material 4, a reduction in the thermal expansion coefficient of the porous material 2 can be achieved at low cost, without using an expensive raw material.

The mass ratio of each component contained in the binding material 4 is obtained in the way described below by using mass ratios measured by inductively coupled plasma (ICP) spectroscopy. First, a carbon (C) component is quantitatively determined by infrared absorption after combustion in an oxygen stream, based on JIS-Z2615 (determination of carbon in metallic materials) and JIS-Z2616 (determination of sulfur in metallic materials). Assuming that the carbon component is all derived from silicon carbide (SiC) of the particle bodies 31, the mass ratio of the silicon carbide is calculated. Also, the mass ratio of silicon dioxide ($SiO_2$) contained in the whole of the porous material 2 is obtained assuming that a remaining mass ratio obtained by subtracting the aforementioned mass ratio of the silicon carbide from the mass ratio of a silicon (Si) component measured by ICP spectroscopy is derived from the silicon dioxide. A remaining mass ratio obtained by subtracting the aforementioned mass ratio of the cristobalite obtained by the X-ray diffraction analysis from the mass ratio of the silicon dioxide is assumed to be the mass ratio of the silicon dioxide component contained in the binding material 4. Then, if the total of the mass ratio of the silicon dioxide component contained in the binding material 4 and the mass ratios of magnesium oxide and aluminum oxide measured by ICP spectroscopy is assumed to be 100 mass %, the ratio of each component obtained at this time is regarded as the mass ratio of that component to the whole of the binding material 4.

In the case of using the porous material 2 (honeycomb structure 1) that supports an SCR catalyst such as zeolite, if the porous material 2 contains an alkali metal component such as sodium, $NO_x$ purification performance is known to degrade due to high-temperature aging (heat treatment). Therefore, in order to suppress the aforementioned degradation in $NO_x$ purification performance due to aging, the mass ratio of the alkali metal component to the whole of the porous material 2 is preferably made less than 0.1 mass % and more preferably less than or equal to 0.03 mass %. The mass ratio of the alkali metal component can be measured by ICP spectroscopy.

The porous material 2 used in the honeycomb structure 1 is required to have a high porosity (here, high open porosity). In order to easily achieve a high porosity of the porous material 2, the mean particle diameter of the aggregate particles 3 is preferably greater than or equal to 5 μm and more preferably greater than or equal to 10 μm. In order to avoid the porous material 2 from having a large number of excessively large pores 21, the mean particle diameter of the aggregate particles 3 is preferably less than or equal to 100 μm and more preferably less than or equal to 40 μm.

The porosity of the porous material 2 is, for example, higher than or equal to 40%. This suppresses an excessive increase in pressure loss in the honeycomb structure 1, which is used as a DPF. This also allows the honeycomb structure 1 to support a large amount of catalyst. In order to further reduce pressure loss and to support a larger amount of catalyst, the porosity is preferably higher than or equal to 50% and more preferably higher than or equal to 55%. Also, the porosity is, for example, lower than or equal to 80%. This ensures a certain level of mechanical strength of the honeycomb structure 1. In order to further increase the mechanical strength, the porosity is preferably lower than or equal to 75% and more preferably lower than or equal to 70%. The open porosity can be measured by, for example, Archimedes method using deionized water as a medium. Note that the porosity can be adjusted by, for example, changing the amount of the pore-forming material, the amount of a sintering agent, or a firing atmosphere in the process of producing the porous material. The porosity can also be adjusted by changing the ratio between an aggregate raw material and a raw material for binding material, which will be described later.

The mean pore diameter of the porous material 2 is preferably greater than or equal to 10 μm and more preferably greater than or equal to 15 μm. Also, the mean pore diameter is preferably less than or equal to 40 μm and more preferably less than or equal to 30 μm. If the mean pore diameter is less than 10 μm, pressure loss may increase. If the mean pore diameter exceeds 40 μm, when the porous material 2 is used in a DPF or other such devices, particulate substances in exhaust gas may not be collected partially and pass through the DPF or other such devices. The mean pore diameter is measured by mercury intrusion porosimetry (in accordance with JIS R1655).

Moreover, pores with pore diameters less than 10 μm preferably make up 20% or less of the total number of pores, and pores with pore diameters greater than 40 μm preferably make up 10% or less of the total number of pores. The pores with pore diameters less than 10 μm are likely to be clogged when the catalyst is supported, and therefore if the pores with pore diameters less than 10 μm make up more than 20% of the total number of pores, pressure loss may increase. The pores with pore diameters greater than 40 μm are likely to pass particulate substances therethrough, and therefore if the pores with pore diameters greater than 40 μm make up more than 10% of the total number of pores, a filtering function may deteriorate.

The bending strength of the porous material 2 is, for example, higher than or equal to 5.0 mega pascals (MPa). This further improves the thermal shock resistance of the porous material 2. The bending strength of the porous material 2 is preferably higher than or equal to 6.5 MPa and more preferably higher than or equal to 7.5 MPa. The upper limit of the bending strength of the porous material 2 is assumed to be approximately 40 MPa. The bending strength can be measured by a bending test compliant with JIS R1601.

Method of Producing Porous Material

Figure 7:
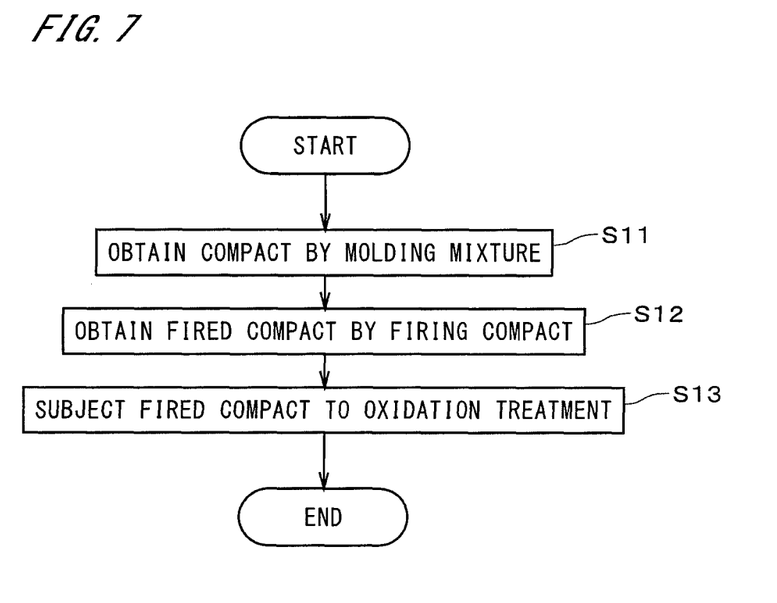
FIG. 7 illustrates a flow of processing for producing the porous material.

FIG. 7 illustrates a flow of processing for producing the porous material 2. Here, the honeycomb structure 1 is produced in the production of the porous material 2. That is, the porous material 2 is produced as the honeycomb structure 1.

First, an aggregate raw material for the aggregate particles 3, a raw material for binding material for generation of the binding material 4 by firing, and a pore-forming material are mixed, and other materials such as a binder, a surface-active agent, or water are added as necessary to prepare a molding raw material. The aggregate raw material contains silicon carbide particles or silicon nitride particles. The mean particle diameter of the aggregate raw material is preferably greater than or equal to 5 μm and more preferably greater than or equal to 10 μm. The mean particle diameter of the aggregate raw material is preferably less than or equal to 100 μm and more preferably less than or equal to 40 μm.

If the aggregate raw material in the molding raw material is assumed to be 100 mass %, the ratio of the raw material for binding material is, for example, higher than or equal to 9.0 mass % and less than or equal to 67.0 mass %. The raw material for binding material contains a cordierite raw material. The cordierite raw material means a raw material for generation of cordierite crystals by firing. The cordierite raw material contains a magnesium oxide component, an aluminum oxide component, and a silicon dioxide component. The magnesium oxide component includes not only magnesium oxide, but also magnesium and oxygen that make up the composition ratio of magnesium oxide in a raw material such as magnesium hydroxide or talc that contains magnesium and oxygen. The aluminum oxide component includes not only aluminum oxide, but also aluminum and oxygen that make up the composition ratio of aluminum oxide in a raw material such as aluminum hydroxide, kaoline, boehmite, or feldspar that contains aluminum and oxygen. The silicon dioxide component includes not only silicon dioxide, but also silicon and oxygen that make up the composition ratio of silicon dioxide in a raw material such as talc, kaoline, or feldspar that contains silicon and oxygen.

A preferable raw material for binding material contains 35 to 45 mass % of talc and 45 to 60 mass % of aluminum oxide (alumina) to the whole of the raw material for binding material. The raw material for binding material may contain silicon dioxide (silica) (i.e., silicon dioxide is an arbitrary raw material), and in this case, the ratio of silicon dioxide is lower than or equal to 10 mass %. In other words, the raw material for binding material contains 35 to 45 mass % of talc, 45 to 60 mass % of aluminum oxide, and 0 to 10 mass % of silicon dioxide to the whole of the raw material for binding material.

The raw material for binding material may further contain other components such as cerium dioxide ($CeO_2$). The lower limit value of the talc is more preferably 40 mass %. The lower limit value of the aluminum oxide is more preferably 50 mass %. The upper limit value of the silicon dioxide component is more preferably 15 mass %.

Examples of the binder include organic binders such as methylcellulose, hydroxypropyl methylcellulose, hydroxyethyl cellulose, carboxymethyl cellulose, and polyvinyl alcohol. The binder content is preferably in the range of 2 to 10 mass % to the whole of the molding raw material.

As the surface-active agent, ethylene glycol, dextrin, fatty acid soap, or polyalcohol can be used, for example. These may be used singly, or two or more of them may be used in combination. The surface-active agent content is preferably lower than or equal to 2 mass % to the whole of the molding raw material.

The pore-forming material is not particularly limited as long as it makes pores after firing, and examples thereof include graphite, starch, foam resins, absorbent polymers, and silica gel. The pore-forming material content is preferably lower than or equal to 40 mass % to the whole of the molding raw material. The mean particle diameter of the pore-forming material is preferably greater than or equal to 10 μm. Also, the mean particle diameter of the pore-forming material is preferably less than or equal to 70 μm. If the mean particle diameter of the pore-forming material is less than 10 μm, pores may not be formed satisfactorily. If the mean particle diameter of the pore-forming material is greater than 70 μm, for example when the porous material according to the present embodiment is used in a DPF or other such devices, particulate substances in exhaust gas may not be collected partially and pass through the DPF or other such devices. Note that in the case where the pore-forming material is an absorbent polymer, the mean particle diameter refers to a value obtained after water absorption. The water content is adjusted appropriately so as to make the hardness of kneaded clay easy to mold, but preferably, the water content is in the range of 20 to 80 mass % to the whole of the molding raw material.

Then, the molding raw material is kneaded into kneaded clay. A method of kneading the molding raw material into kneaded clay is not particularly limited, and one example thereof is using a device such as a kneader or a vacuum kneading machine. Thereafter, the kneaded clay is subjected to extrusion molding to form a honeycomb compact (compact). Note that the kneaded clay is also included in the concept of the molding raw material. The extrusion molding preferably uses a die having desired properties such as overall shape, cell shape, partition wall thickness, and cell density.

The material for the die is preferably hard metal that is resistant to wear. The honeycomb compact is structured to include partition walls that partition the honeycomb compact into a plurality of cells serving as flow paths for fluid, and a tubular outer wall located on the outermost perimeter. The properties of the honeycomb compact such as partition wall thickness, cell density, and tubular outer wall thickness are appropriately determined in consideration of shrinkage during drying and firing and in accordance with the figure of the honeycomb structure to be produced. As described above, the compact is obtained by molding the mixture (molding raw material) of the aggregate raw material, the raw material for binding material, and the pore-forming material (step S11).

The honeycomb compact is preferably dried before firing, which will be described later. A drying method is not particularly limited, and examples thereof include electromagnetic-wave heating methods such as drying by microwave heating and drying by high-frequency dielectric heating, and external heating methods such as hot air drying and superheated steam drying. From the viewpoint of being able to rapidly and uniformly dry the entire compact without causing cracking, it is preferable that among these methods, an electromagnetic-wave heating method is first used to dry a certain amount of moisture, and then an external heating method is used to dry the remaining moisture. In this case, for example, 30 to 99 mass % of moisture with respect to the amount of moisture before drying is removed from the honeycomb compact by the electromagnetic-wave heating method, and then the moisture in the honeycomb compact is further reduced to 3 mass % or less by the external heating method. A preferable electromagnetic-wave heating method is drying by dielectric heating, and a preferable external heating method is hot air drying.

If the honeycomb compact does not have a desired length in the direction of extension of the cells, it is preferable that the honeycomb compact is cut to the desired length. A cutting method is not particularly limited, and one example thereof is using a device such as a circular saw cutter.

Then, the compact is fired to obtain a fired compact (step S12). Here, calcination is preferably performed before firing in order to remove the binder or other components. The calcination is performed in an ambient atmosphere, for example, at a temperature of 200 to 600° C. for 0.5 to 20 hours. The firing is performed in an inert atmosphere filled with inert gas such as nitrogen or argon (with an oxygen partial pressure of $10^{-4}$ atmospheres or less). The firing temperature is, for example, higher than or equal to 1300° C. By firing the compact, a binding material composed primarily of cordierite is generated, and the binding material binds the aggregate particles together in a state where pores are provided therein. The firing temperature is preferably higher than or equal to 1330° C. and more preferably higher than or equal to 1350° C. The firing temperature is, for example, lower than or equal to 1600° C. and preferably lower than or equal to 1500° C. The pressure during firing is preferably normal atmospheric pressure. The firing time is, for example, longer than or equal to one hour and shorter than or equal to 20 hours.

After the firing process, the fired compact is subjected to heat treatment (oxidation treatment) in an oxidizing atmosphere to obtain a porous material that is a honeycomb structure (step S13). The oxidizing atmosphere is, for example, an ambient atmosphere (which may contain water vapor). As described previously, the aggregate raw material contains silicon carbide particles or silicon nitride particles of non-oxide, and therefore oxide films are provided on surfaces of these particles by the oxidation treatment. Accordingly, the porous material can provide excellent oxidation resistance.

In order to properly form the oxide films, the oxidation treatment temperature is preferably higher than or equal to 1100° C. and more preferably higher than or equal to 1150° C. The oxidation treatment temperature is also preferably lower than or equal to 1300° C. and more preferably lower than or equal to 1270° C. The oxidation treatment time is, for example, longer than or equal to one hour and shorter than or equal to 20 hours. The thicknesses of the oxide films can be adjusted to some extent by changing conditions for the oxidation treatment. The calcination, the firing, and the oxidation treatment can be performed using, for example, an electric furnace or a gas furnace. The porous material produced by the above-described processing has a small dimensional change before and after firing, and therefore it is possible to improve dimensional accuracy and to improve productivity of the honeycomb structure.

EXAMPLES

Next, examples will be described. Here, porous materials (honeycomb structures) were produced as Examples 1 to 5 and Comparative Examples 1 to 3 under conditions given by Table 1.

TABLE 1

| | | Composition of Raw Material for Binding Material | | | Firing Temperature | Oxidation Temperature |
|---|---|---|---|---|---|---|
| | | Talc | Al2O3 | SiO2 | ° C. | ° C. |
| Example | 1 | 40.7 | 51.0 | 8.3 | 1400 | 1250 |
| Example | 2 | 40.1 | 50.0 | 9.9 | 1400 | 1250 |
| Example | 3 | 42.3 | 52.7 | 5.0 | 1400 | 1250 |
| Example | 4 | 44.5 | 54.4 | 1.0 | 1400 | 1250 |
| Example | 5 | 44.4 | 55.6 | 0.0 | 1400 | 1250 |
| Comparative Example | 1 | 33.3 | 50.0 | 16.7 | 1400 | 1270 |
| Comparative Example | 2 | 35.8 | 45.1 | 19.1 | 1370 | 1300 |
| Comparative Example | 3 | 36.4 | 45.4 | 18.3 | 1400 | 1270 |

Examples 1 to 5

First, powdered silicon carbide (SiC) serving as an aggregate raw material and a powdered raw material for binding material were mixed to prepare base powder. The raw material for binding material contains talc, aluminum oxide ($Al_2O_3$), and silicon dioxide ($SiO_2$), and the mass ratio of each material to the whole of the raw material for binding material is as given in the "Composition of Raw Material for Binding Material" column in Table 1. Examples 1 to 5 satisfy the condition that the raw material for binding material contains 35 to 45 mass % of talc, 45 to 60 mass % of aluminum oxide, and 0 to 10 mass % of silicon dioxide to the whole of the raw material for binding material.

In Example 5, the raw material for binding material does not contain silicon dioxide. Then, a pore-forming material, a binder, and water were added to the aforementioned base powder to obtain a molding raw material. Thereafter, the molding raw material was kneaded using a kneader to obtain plastic kneaded clay (molding raw material).

Next, the obtained kneaded clay was molded and processed into a circular cylinder shape (cylindrical shape) using a vacuum kneading machine, and the obtained circular cylindrical kneaded clay was put into an extruder to obtain a honeycomb-shaped honeycomb compact by extrusion molding. The honeycomb compact was then dried in two stages, i.e., first dried with microwaves and then dried using a hot air drier. After the honeycomb compact was adjusted to a desired length by cutting both ends thereof, the honeycomb compact was subjected to degreasing treatment (calcination treatment) in which the honeycomb compact was degreased at a predetermined temperature in an ambient atmosphere. Thereafter, the honeycomb compact was fired in an inert gas atmosphere (argon gas atmosphere) and then subjected to oxidation treatment in the atmosphere. The temperature during firing (firing temperature) and the temperature during oxidation treatment (oxidation temperature) are as given in Table 1. In this way, the porous materials having honeycomb structures (simply, honeycomb structures) of Examples 1 to 5 were obtained.

Comparative Examples 1 to 3

The porous materials of Comparative Examples 1 to 3 were produced in approximately the same manner as in Examples 1 to 5, except that the raw material for binding material failed to satisfy the condition that the raw material for binding material contained 35 to 45 mass % of talc, 45 to 60 mass % of aluminum oxide, and 0 to 10 mass % of silicon dioxide to the whole of the raw material for binding material.

Various Measurements of Porous Materials

For each produced porous material, the mass ratio of each crystalline phase to the whole of the porous material and the mass ratio of each component to the whole of the binding material were measured. Table 2 shows the results of measurements performed on the porous materials of Examples 1 to 5 and Comparative Examples 1 to 3.

The mass ratio of each crystalline phase of the porous material were obtained in the way described below. An X-ray diffraction pattern of the porous material was obtained using an X-ray diffractometer. A multi-function X-ray powder diffractometer (D8 ADVANCE by Bruker Corporation) was used as the X-ray diffractometer. Conditions for the X-ray diffractometry include CuKα-ray source, 10 kV, 20 mA, and 2θ=5 to 100°. Then, obtained X-ray diffraction data was analyzed by the Rietveld method using analysis software TOPAS (by Bruker AXS) to quantitatively determine each crystalline phase. Assuming that the sum of the masses of all detected crystalline phases was 100 mass %, the mass ratio of each crystalline phase of components was calculated. In the porous materials of Examples 1 to 5 and Comparative Examples 1 to 3, the mass ratio of cordierite was in the range of 15 to 20 mass % to the whole of the porous material.

The mass ratio of each component (MgO, $Al_2O_3$, $SiO_2$) in the binding material was obtained in the way described below by using mass ratios measured by ICP spectroscopy. First, a carbon (C) component was quantitatively determined by infrared absorption after combustion in an oxygen stream, based on JIS-Z2615 (determination of carbon in metallic materials) and JIS-Z2616 (determination of sulfur in metallic materials). Assuming that the carbon component was all derived from silicon carbide (SiC) of the particle bodies, the mass ratio of the silicon carbide was calculated. Also, the mass ratio of silicon dioxide ($SiO_2$) contained in the whole of the porous material 2 was obtained assuming that a remaining mass ratio obtained by subtracting the aforementioned mass ratio of the silicon carbide from the mass ratio of a silicon (Si) component measured by ICP spectroscopy was derived from silicon dioxide. A remaining mass ratio obtained by subtracting the aforementioned mass ratio of the cristobalite obtained by the X-ray diffraction analysis from the mass ratio of the silicon dioxide was assumed to be the mass ratio of the silicon dioxide component contained in the binding material. Then, if the total of the mass ratio of the silicon dioxide component contained in the binding material and the mass ratios of magnesium oxide and aluminum oxide measured by ICP spectroscopy was assumed to be 100 mass %, the ratio of each component obtained at this time was regarded as the mass ratio of that component to the whole of the binding material.

Moreover, a mass gain by oxidation, the thickness of the oxide films on the binding material side, the thickness of the oxide films on the pore side, the thickness ratio between the oxide films (on the binding material side and on the pore side), the open porosity, the bending strength, and the thermal expansion coefficient were measured for each porous material. Table 3 shows the results of measurements performed on the porous materials of Examples 1 to 5 and Comparative Examples 1 to 3.

TABLE 2

| | | Ratio of Each Crystalline Phase in Porous Material | | | | Composition Ratio of Binding Material | | |
|---|---|---|---|---|---|---|---|---|
| | | SiC | Cordierite | Cristobalite | Mullite | MgO | $Al_2O_3$ | $SiO_2$ |
| | | Mass % | | | | Mass % | | |
| Example | 1 | 66.5 | 19.2 | 12.0 | 2.3 | 11.3 | 46.6 | 42.1 |
| Example | 2 | 67.7 | 17.3 | 12.2 | 2.8 | 11.2 | 45.7 | 43.1 |
| Example | 3 | 67.1 | 17.3 | 12.1 | 3.4 | 11.8 | 48.0 | 40.2 |
| Example | 4 | 68.3 | 17.6 | 11.4 | 2.7 | 12.4 | 49.5 | 38.1 |
| Example | 5 | 68.5 | 16.8 | 11.7 | 3.1 | 12.3 | 50.5 | 37.2 |
| Comparative Example | 1 | 64.6 | 15.2 | 13.0 | 7.3 | 9.3 | 45.6 | 45.1 |
| Comparative Example | 2 | 64.6 | 16.8 | 13.1 | 5.5 | 10.3 | 42.3 | 47.4 |
| Comparative Example | 3 | 68.7 | 17.3 | 12.9 | 1.2 | 10.1 | 41.7 | 48.2 |

TABLE 3

|  |  | Mass Gain by Oxidation % | Thickness of Oxide Films on Binding Material Side μm | Thickness of Oxide Films on Pore Side μm | Thickness Ratio between Oxide Films (Binding Material Side/ Pore Side) | Open Porosity % | Bending Strength MPa | Thermal Expansion Coefficient (40-250° C.) ppm/K | Thermal Shock Resistance |
|---|---|---|---|---|---|---|---|---|---|
| Example | 1 | 5.0 | 0.45 | 0.79 | 0.57 | 65.6 | 7.6 | 4.6 | ⊚ |
| Example | 2 | 5.2 | 0.45 | 0.80 | 0.56 | 67.0 | 8.2 | 4.7 | ⊚ |
| Example | 3 | 5.3 | 0.38 | 0.76 | 0.50 | 64.8 | 8.2 | 4.6 | ⊚ |
| Example | 4 | 5.1 | 0.43 | 0.75 | 0.58 | 65.8 | 6.8 | 4.5 | ○ |
| Example | 5 | 5.1 | 0.42 | 0.74 | 0.57 | 66.1 | 6.7 | 4.6 | ○ |
| Comparative Example | 1 | 5.4 | 0.91 | 0.83 | 1.09 | 66.0 | 7.2 | 5.4 | X |
| Comparative Example | 2 | 5.2 | 1.76 | 0.73 | 2.42 | 67.0 | 4.9 | 5.8 | X |
| Comparative Example | 3 | 5.2 | 1.37 | 0.74 | 1.86 | 64.9 | 6.9 | 5.2 | X |

As to the mass gain by oxidation, the rate of increase in the mass of the porous material (fired compact) after the oxidation treatment was obtained with respect to the mass of the porous material before the oxidation treatment. In the measurement of the thickness of the oxide films on the binding material side, a section obtained by mirror polishing the porous material was observed with a scanning electron microscope under a magnification of 10,000 times. As described with reference to FIG. 5, a field of view was set in which the surface of a particle body in contact with an oxide film on the binding material side extended in the lateral direction, four parting lines were set so as to divide that field of view into five equal parts in the lateral direction, and an EDS measurement was performed at each of positions at 0.2 μm intervals on each parting line from the surface of the particle body toward the binding material. On each parting line, the length from the surface of the particle body to the furthest position from that surface among positions at which a component such as magnesium (Mg) contained in the binding material was not detected was regarded as the thickness of the oxide film on that parting line. Then, a mean value of the thicknesses of the oxide films on a total of 12 parting lines in three fields of view was obtained as the thickness of the oxide films on the binding material side.

In the measurement of the thickness of the oxide films on the pore side, four parting lines were set in a field of view that was set in which the surface of a particle body in contact with the oxide film on the pore side extended in the lateral direction. On each parting line, EDS measurements were performed in the same manner as described above, and the length from the surface of the particle body to the furthest position from that surface among positions at which a component such as oxygen (O) contained in the oxide film was detected was regarded as the thickness of the oxide film on that parting line. Then, a mean value of the thicknesses of the oxide films on a total of 12 parting lines in three fields of view was obtained as the thickness of the oxide films on the pore side. The thickness ratio between the oxide films (on the binding material side and on the pore side) was obtained by dividing the thickness of the oxide films on the binding material side by the thickness of the oxide films on the pore side.

The open porosity was measured using a piece of plate that was cut out in dimensions of 20 mm×20 mm×0.3 mm from the porous material, by Archimedes method using deionized water as a medium. The porous materials of Examples 1 to 5 and Comparative Examples 1 to 3 had approximately the same open porosity. In the measurement of the bending strength, the honeycomb structure (porous material) was processed into a test specimen with dimensions of 0.3 mm high×4 mm width×40 mm long where the direction of penetration of the cells is the longitudinal direction, and a binding test compliant with JIS R1601 was conducted on the test specimen. The porous materials of Examples 1 to 5 all had high bending strengths higher than or equal to 6.0 MPa. In the measurement of the thermal expansion coefficient, a test specimen was cut out in dimensions of 3 cells high×3 cells wide×20 mm long from the honeycomb structure, and a mean coefficient of linear thermal expansion (thermal expansion coefficient) in the temperature range of 40 to 250° C. in the direction parallel to the flow paths in the honeycomb structure was measured by a method compliant with JIS R1618.

Table 3 further shows an item of "Thermal Shock Resistance." In the evaluation of the thermal shock resistance, crosses indicate porous materials having thermal expansion coefficients higher than 5.0 ppm/K. Among porous materials having thermal expansion coefficients lower than or equal to 5.0 ppm/K, those that have bending strengths higher than or equal to 7.5 MPa are indicated by double circles, and those that have bending strengths lower than 7.5 MPa are indicated by open circles.

Table 3 shows that, in the porous materials of Comparative Examples 1 to 3, the thicknesses of the oxide films on the binding material side are all greater than 0.90 μm, and the thermal expansion coefficients are all higher than 5.0 ppm/K. In contrast, in the porous materials of Examples 1 to 5, the thicknesses of the oxide films on the binding material side are all less than or equal to 0.90 μm, and the thermal expansion coefficients are all lower than or equal to 5.0 ppm/K. Accordingly, with the porous materials of Examples 1 to 5, it is possible to improve thermal shock resistance by the reduction in thermal expansion coefficient, while improving oxidation resistance by the presence of the oxide films. The porous materials of Examples 1 to 3 had bending strengths higher than or equal to 7.5 MPa. Therefore, the porous materials of Examples 1 to 3 can provide further improved thermal shock resistance. Although the reason why the porous materials of Examples 1 to 3 had higher bending strengths than the porous materials of Examples 4 and 5 is unclear, integral effects are conceivable such as a difference in the mass ratio of the cordierite and the presence of minute amounts of crystalline phases such as spinel or sapphirine.

Variations

The porous material 2, the honeycomb structure 1, and the method of producing a porous material described above can be modified in various ways.

The porous material 2 may be formed in different forms other than the honeycomb structure 1, and may be used in various applications other than filters. Depending on the application of the porous material 2, the aggregate particles 3 may contain particles of a plurality of types of substances.

The methods of producing the porous material 2 and the honeycomb structure 1 are not limited to the examples described above, and may be modified in various ways.

The configurations of the above-described preferred embodiments and variations may be appropriately combined as long as there are no mutual inconsistencies.

While the invention has been shown and described in detail, the foregoing description is in all aspects illustrative and not restrictive. It is therefore to be understood that numerous modifications and variations can be devised without departing from the scope of the invention. This application claims priority benefit under 35 U.S.C. Section 119 of Japanese Patent Application No. 2018-057354 filed in the Japan Patent Office on Mar. 26, 2018, the entire disclosure of which is incorporated herein by reference.

REFERENCE SIGNS LIST

1 Honeycomb structure
2 Porous material
3 Aggregate particle
4 Binding material
12 Partition wall
13 Cell
21 Pore
31 Particle body
32, 32a, 32b Oxide film
S11 to S13 Step

The invention claimed is:

1. A porous material comprising:
   aggregate particles in which oxide films containing cristobalite are provided on surfaces of particle bodies that are silicon carbide particles; and
   a binding material that contains cordierite and binds said aggregate particles together in a state where pores are provided therein,
   wherein a mass ratio of said cordierite to a whole of said porous material is in a range of 10 to 40 mass %,
   said oxide films that exist between said particle bodies and said binding material have a thickness greater than or equal to 0.30 μm and less than or equal to 0.45 μm,
   said oxide films that exist between said particle bodies and said pores have a thickness greater than or equal to 0.70 μm and less than or equal to 0.80 μm, and
   wherein said binding material contains 10 to 15 mass % of a magnesium oxide component, 40 to 55% of an aluminum oxide component, and 35 to 44 mass % of a silicon dioxide component to a whole of said binding material.

2. The porous material according to claim 1, wherein the thickness of said oxide films that exist between said particle bodies and said binding material is less than or equal to the thickness of said oxide films that exist between said particle bodies and said pores.

3. The porous material according to claim 1, wherein a thermal expansion coefficient in a temperature range of 40° C. to 250° C. is lower than or equal to 5.0 ppm/K.

4. The porous material according to claim 1, wherein a bending strength is higher than or equal to 5.0 MPa.

5. The porous material according to claim 1, wherein an open porosity is higher than or equal to 50% and lower than or equal to 70%.

6. A cell structure made of the porous material according to claim 1 and whose interior is partitioned into a plurality of cells by partition walls.

7. A method of producing a porous material, comprising:
   a) obtaining a compact by molding a mixture of an aggregate raw material, a raw material for binding material, and a pore-forming material;
   b) obtaining a fired compact by firing said compact in an inert atmosphere; and
   c) obtaining a porous material by subjecting said fired compact to an oxidation treatment in an oxidizing atmosphere,
   wherein said aggregate raw material contains silicon carbide particles,
   said raw material for binding material contains 35 to 45 mass % of talc, 45 to 60 mass % of aluminum oxide, and 0 to 10 mass % of silicon dioxide to a whole of said raw material for binding material;
   said porous material comprising:
   aggregate particles in which oxide films containing cristobalite are provided on surfaces of particle bodies that are silicon carbide particles; and
   a binding material that contains cordierite and binds said aggregate particles together in a state where pores are provided therein,
   wherein a mass ratio of said cordierite to a whole of said porous material is in a range of 10 to 40 mass %,
   said oxide films that exist between said particle bodies and said binding material have a thickness greater than or equal to 0.30 μm and less than or equal to 0.45 μm, and
   said oxide films that exist between said particle bodies and said pores have a thickness greater than or equal to 0.70 μm and less than or equal to 0.80 μm, and
   wherein said binding material contains 10 to 15 mass % of a magnesium oxide component, 40 to 55% of an aluminum oxide component, and 35 to 44 mass % of a silicon dioxide component to a whole of said binding material.

* * * * *